Feb. 25, 1969        C. CONNALLY, JR        3,429,372
OIL RECOVERY METHOD EMPLOYING THICKENED WATER AND CROSSFLOODING
Filed Sept. 15, 1967

INVENTOR
CARL CONNALLY, JR.

*Emil J. Bednar*

ATTORNEY

United States Patent Office 3,429,372
Patented Feb. 25, 1969

---

3,429,372
OIL RECOVERY METHOD EMPLOYING THICKENED WATER AND CROSSFLOODING
Carl Connally, Jr., Dallas, Tex., assignor to Mobil Oil Corporation, a corporation of New York
Filed Sept. 15, 1967, Ser. No. 667,965
U.S. Cl. 166—245                 6 Claims
Int. Cl. E21b 43/20

ABSTRACT OF THE DISCLOSURE

This specification discloses: A waterflooding method for recovering oil from a subterranean formation which is practiced through a regular geometric well pattern. In the pattern, a plurality of peripheral wells are equidistantly spaced from one another with a central well located at their midpoint. In succession, amounts of flood water, thickened water, and additional flood water are injected into the formation, via the central well, until the first injected flood water, and then the thickened water, arrives at each of the peripheral wells. Any thickening agent can be used in the thickened water which provides it with a mobility no greater than the mobility of the oil in the unflooded formation. Each injected water may be used in an amount about equal to 30 percent of the hydrocarbon pore volume of the water-swept formation. The water-displaced oil moves towards the peripheral wells from which the oil is produced. The central well may be closed in when undesired amounts of water are produced with oil from the peripheral wells. Food water is then injected, as a crossflooding, into the formation from alternate wells of the peripheral wells to displace oil towards the remaining peripheral wells from which the oil is produced.

BACKGROUND OF THE INVENTION

Field of the invention

This invention relates to the recovery of oil from a subterranean formation and, more particularly, to the recovery of oil from a subterranean formation wherein water is employed as an oil-displacing fluid.

Description of the prior art

The oil accumulated in a subterranean formation is recovered, or produced, through wells drilled into the formation. Generally, the wells are employed in a regular geometric pattern for convenience and for efficient recovery of the oil. In many instances, the oil is produced from the formation by initial reservoir energy. However, this mode of oil production usually leaves large amounts of oil in place. There are formations devoid of sufficient reservoir energy to produce the oil. Under these circumstances, energy from external sources must be employed for producing the oil from the formation. Generally, oil recovery operations using external energy may be termed "secondary recovery" operations. However, these operations may be also employed for the initial recovery of oil from the formation. An example of such operations is the displacement of oil, by an injected fluid, from the formation into a well. More particularly, fluid is passed from an injection well through the formation towards a production well. The fluid-displaced oil is recovered through the production well. The energy of the injected fluid promotes the displacement and production of the oil from the formation. Water may be employed as the oil-displacing fluid. This operation is commonly denoted as a waterflood. The injected water is referred to as flood water to distinguish it from the connate water in the formation.

It has been found in a waterflood that the water does not always sweep all portions of the formation residing between injection and production wells. Generally, the portion of the formation traversed by the injected water is termed the "sweep pattern" of the waterflood. The ratio of the area within the sweep pattern to the total area encompassed within the well pattern is termed the "sweep efficiency" of the waterflood. Naturally, for the most economical recovery of oil, a maximum areal sweep efficiency is required for a given well pattern. For this reason, the injection and production wells are generally arranged in regular and uniform geometric patterns wherein each central injection well is located at the midpoint of a plurality of equally spaced production wells. The sweep efficiencies of a waterflood carried out in such well patterns are high. However, a problem of water bypassing during crossflooding can occur even in such a well pattern.

Crossflooding is an operation effected in a well pattern wherein waterflooding is carried out successively in two adjacent areas in the formation. For example, a waterflood is carried out in a first area between a central well and a plurality of peripheral wells. This waterflood leaves unswept a second area in the formation which extends directly between adjacent peripheral wells. The oil in the unswept area may be recovered by closing in the central well. Then, water is injected into alternate peripheral wells to carry out a waterflood of the unswept second area towards the remaining peripheral wells. This second waterflood operation may be termed "crossflooding." However, the water which is injected in the second waterflood flows in undesired large amounts through the first area swept by the earlier waterflood. This undesired water flow may be termed "bypassing." This bypassing of the injected water during crossflooding leads to inefficient operation in recovering oil. It is the purpose of the present method to reduce such bypassing of water in carrying out crossflooding in a waterflood operation for recovering oil.

SUMMARY OF THE INVENTION

This invention is a method which employs waterflooding for recovering oil from a subterranean formation penetrated by a geometric pattern of wells. In the geometric pattern, a central well resides at the midpoint of a plurality of surrounding peripheral wells equidistantly spaced from one another. Flood water is injected, via the central well, into the formation to displace oil towards the peripheral wells. The flood water is injected in an amount sufficient that the water arrives at each of the peripheral wells. The oil displaced by this water is recovered from the formation through the peripheral wells. Then, thickened water is injected through the central well to displace the oil, and the priorly injected flood water, towards the peripheral wells. This thickened water contains a water-thickening agent to increase its viscosity in an amount such that the mobility of the thickened water is no greater than the mobility of the oil in the unflooded regions of the formation. The thickened water is employed in an amount sufficient that the water arrives at each of the peripheral wells. The oil displaced by the thickened water is recovered from the formation through the peripheral wells. The central well is closed in, and then, flood water is injected through alternate peripheral wells, into the formation in an amount sufficient to displace oil towards the remaining peripheral wells. The oil displaced by the flood water is recovered from the formation through these remaining peripheral wells.

DESCRIPTION OF SPECIFIC EMBODIMENTS

Figure 1:
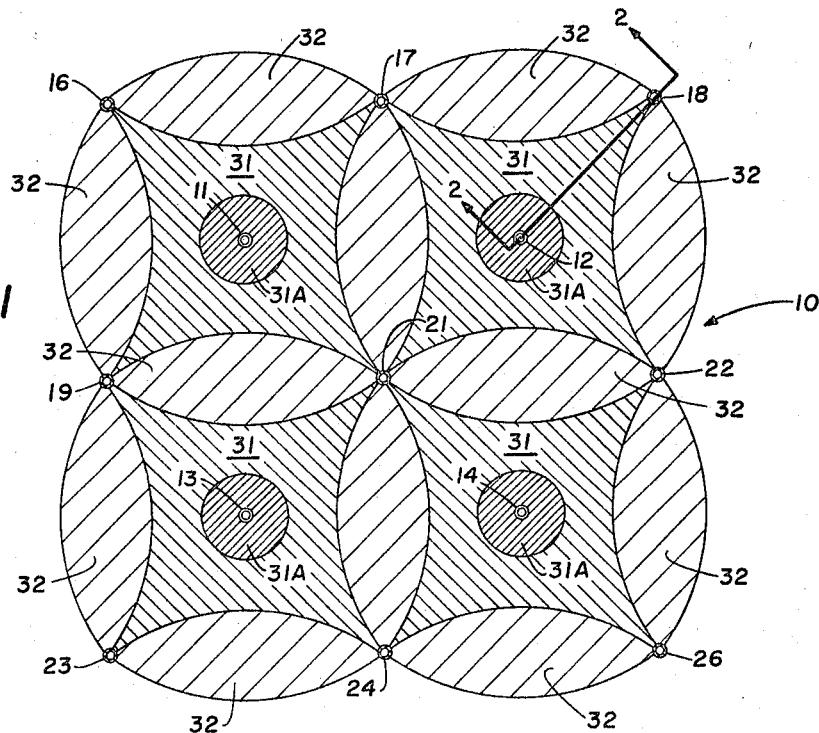
FIGURE 1 is a schematic diagram of a regular geometric pattern of wells in a formation with area-shading indicating the results of stepwise waterflooding operations produced in the pattern by the present method.

Referring now to FIGURE 1, there is shown a suitable environment in which the present method can be practiced. This environment includes a subterranean formation 10 containing oil in a geological structure which permits the oil to be recovered by waterflooding operations. The formation 10 is penetrated by a plurality of wells arranged in a regular geometric pattern. The term "oil" is used herein to denote all hydrocarbonous fluids, or petroleum, and includes mixtures of hydrocarbons in liquid and gaseous phases. The pattern contains central wells 11, 12, 13, and 14 which are arranged structurally for injecting fluids into the formation 10. The central well 11 is surrounded by peripheral wells 16, 17, 19, and 21. The central well 12 is surrounded by peripheral wells 17, 18, 21, and 22. The central well 13 is surrounded by peripheral wells 19, 21, 23, and 24. The central well 14 is surrounded by peripheral wells 21, 22, 24, and 26. Each central well is surrounded by four equidistantly spaced peripheral wells. Also, each central well is located at a midpoint between four surrounding peripheral wells. Additionally, the peripheral wells 17, 21, 19, 22, and 24 are common to adjoining well patterns. The peripheral wells are arranged structurally for recovering fluids from the formation 10.

The well pattern is formed by four adjoining 5-spot well patterns formed about the central wells 11, 12, 13, and 14. However, the pattern may consist of one central well and several peripheral wells. If desired, other geometric patterns of wells may be used to practice the present method. Also, the central and peripheral wells may be of any suitable construction which provides for conducting fluids between the earth's surface and the formation 10. The particular construction and geometric pattern arrangement, of these wells, are not critical to the carrying out of the present method.

The present method is carried out in several steps. In the first step, flood water is injected through each of the central wells 11, 12, 13, and 14 into the formation 10 to displace oil therein towards the peripheral wells 16, 17, 18, 19, 21, 22, 23, 24, and 26. This flood water is any water usable in a water flood but should be substantially free of thickening agents which substantially increase its viscosity. It should have a viscosity of about 1 cp. at atmospheric conditions. The water may be obtained from any suitable source. The flood water is injected in an amount to fill up the voids, such as the pore spaces, and to compress free gas in the formation 10. Thereafter, a small additional amount of flood water causes it to undergo a rapid movement through the more permeable horizons of the formation 10. Under these circumstances, the injected flood water will appear in small amounts at each of the peripheral wells very soon after "fill-up" flooding of the formation 10.

During the "fill-up" flooding of the formation 10 by the injected flood water, substantial oil production occurs at the peripheral wells before appreciable water is coproduced. The injection of flood water into the formation 10, as described, produces an early response in the recovery of oil from the peripheral wells. This type of oil recovery operation is most economical and efficient since the flood water does not require "thickening" additives to facilitate the displacement of oil through the formation 10.

When more than nominal amounts of flood water appear in the oil from each peripheral well, the injection of the flood water into the central well is interrupted. The flood water remains principally dispersed throughout the voids of the formation 10 between the central and peripheral wells. Thus, this water is not present in the form of a "liquid bank." This formation-spanning dispersal of the flood water is of advantage in the succeeding steps of the present method.

The oil displaced by the flood water is recovered from the formation 10 through the peripheral wells.

In another step, "thickened" water is injected into the formation 10 through each of the central wells to displace oil towards the peripheral wells. The terminology "thickened" water, as used herein, means a water which contains a water-thickening agent. The water-thickening agent increases the viscosity of the water in an amount such that the mobility of the thickened water is no greater than the mobility of the oil in the unflooded regions of the formation 10.

The mobility of the oil, and the mobility of the thickened water, in a particular formation are related to their respective viscosities according to the following equations:

$$M_o = \frac{K_o}{\mu_o} \quad M_w = \frac{K_w}{\mu_w}$$

wherein:

$M_o$ is the mobility of the oil in the formation, $M_w$ is the mobility of the thickened water in the formation, $\mu_o$ is the viscosity of the oil, $\mu_w$ is the viscosity of the thickened water, $K_w$ is the relative permeability of the formation to the thickened water in the presence of the oil which remains after passage of the water, and $K_o$ is the relative permeability of the formation to the oil in the presence of the connate water.

The thickened water is injected in an amount sufficient that the water arrives at each of the peripheral wells. As a result, the formation 10 is filled within the geometric pattern of wells with a water of such characteristics that bypassing of water into water-swept areas is prevented during crossflooding with flood water of adjacent but unswept areas of the formation. At the time the thickened water arrives at each of the peripheral wells, the central wells are closed in.

The thickened water fills the formation 10 residing between the central and peripheral wells. The formation 10 containing the thickened water is illustrated by the shaded areas 31. The thickened water displaces the oil, and earlier injected flood water, towards the peripheral wells. However, only small amounts of the flood water will be produced with the oil until substantially all of the remaining water-displaceable oil is recovered from the areas 31 of the formation 10. This result is provided by the dispersion of substantially all of the flood water in the voids of the formation 10. Thus, the thickened water first builds a bank of the flood water. Then, this bank displaces the oil towards the peripheral wells.

Any water-thickening agent, which can increase the viscosity of the injected thickened water in the magnitude precedingly defined, can be employed. Many water-thickening agents are known and any of them can provide such viscosity-increasing action. Many of these agents are water-soluble. Agents that have been suggested for this purpose include naturally occurring gums, sugars, and natural and synthetic polymers. Preferably, the water-thickening agent is a stable, synthetic polymer that is not subject to bacterial degradation. Synthetic polymers such as polysaccharides or polyacrylamides can be employed, if desired. Also, the polymers described in U.S. Patent 3,308,883 can be used for this purpose.

In employing the polymer of U.S. Patent 3,308,883, the thickened water injected into the formation 10 preferably contains from 0.01 to 1.0 percent by weight of a sulfonated poly-(2,6-dialkyl phenol), or its water-soluble salts which are the full functional equivalent. Under these conditions, the thickened water contains a water-thickening agent which provides the defined mobility characteristic.

The oil displaced in the formation 10 during the filling of the areas 31 by the thickened water is recovered from the peripheral wells.

As another step, flood water is injected through alternate wells among the peripheral wells into the formation in an amount sufficient to displace oil towards the remaining peripheral wells. For example, the peripheral wells 17, 19, 22, and 24 are arranged structurally to be used as injectors. The peripheral wells 16, 18, 21, 23 and 26 are used for recovering fluids from the formation 10. The flood water displaces the oil from the unswept areas 32 residing adjacent the priorly water flooded areas 31. The flood water can be obtained from the same source as the first-mentioned flood water.

The oil displaced from areas 32 in the formation 10 is recovered from the wells 16, 18, 21, 24 and 26.

The flood water will have little tendency to bypass the areas 32 and flow into the priorly water-swept areas 31. More particularly, bypassing water flows are restricted by the specified mobility of the thickened water filling the areas 31. Therefore, the flood water introduced into the areas 32 displaces oil therefrom more readily than it displaces the thickened water filling the areas 31. Thus, a more efficient flooding of the areas 32 by flood water is obtained.

In an alternative embodiment of the present method, additional flood water is used to displace the thickened water in the areas 31 away from the central wells. In this regard, flood water is introduced through the central wells 11, 12, 13, and 14 immediately after the thickened water. This flood water fills a shaded area 31A about the central wells within the area 31. Thus, the amount of the thickened water may be reduced by the amount of flood water filling the area 31A. This mode of operation is of economic advantage since the same quantity of oil can be displaced by a relatively smaller amount of the thickened water followed by an amount of flood water. The displaced oil is produced from the peripheral wells until unacceptable amounts of water are produced with the oil. It will be apparent that the thickened water in this case will reside in the areas 31 surrounding the flood water filling the areas 31A.

Figure 2:
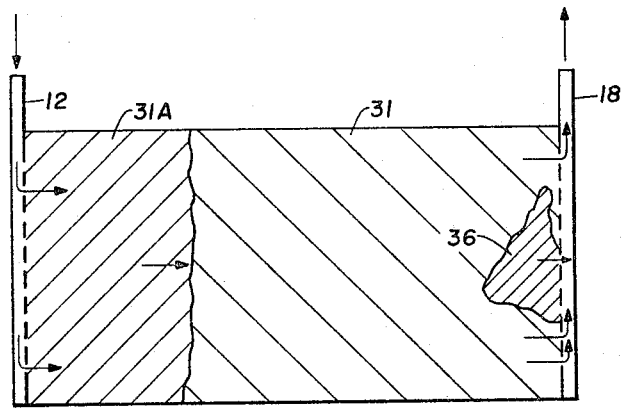
FIGURE 2 is an enlarged vertical section, taken through FIGURE 1 along line 2—2, illustrating the waterflooded condition of the formation after practicing certain steps of the present method.

In this alternative embodiment, the following steps also can be employed to advantage. In many instances, it may be undesirable to adjust amounts of the injected waters by their appearance at the peripheral wells. In this instance, fixed amounts of these waters may be used. The advantage of using fixed amounts of these waters may be appreciated by referring to FIGURE 2. The central well 12 and peripheral well 18 are shown penetrating into the formation 10. In accordance with the present method, flood water is passed through the formation 10 from the central well 12 towards the production well 18. This water "fills up" the formation 10 and displaces oil to the peripheral well 18 from which it is recovered. Then, a small amount of the water, indicated by shaded area 36, appears at the peripheral well 18. Then, thickened water is introduced into the formation 10 from the central well 12 and moves toward the peripheral well 18. The thickened water fills the area 31 until it eventually appears at peripheral well 18. The last injected flood water fills the area 31A about the central well 12. It has been determined that the amounts of the several injected waters can be about equal in most formations. It is therefore convenient, especially when the formation 10 is of uniform permeability and fluid-saturation, to use about equal amounts of each of the injected waters.

More particularly, the amounts of each water introduced into the formation 10 by the steps of the present method are correlated to the "hydrocarbon pore volume" of the formation 10 traversed by the flooding waters. The particular amounts of each of these injected waters can be expressed as a percentage of the "hydrocarbon pore volume" of the formation 10. The "hydrocarbon pore volume," as used herein, means the volume occupied by reservoir oil in that portion of the formation 10 traversed by the injected waters in their displacement of oil towards the peripheral wells. In the example which was described in reference to FIGURE 1, the hydrocarbon pore volume is taken in that portion of the formation 10 designated in the horizontal by the shaded areas 31 and 31A. Obviously, the hydrocarbon pore volume is that volume occupied by reservoir oil in the water-contacted portion of the formation 10. The hydrocarbon pore volume of the formation 10 may be determined sufficiently closely for purposes for practicing the present method in accordance with procedures well known in the industry from certain information obtained by established investigating methods. Such procedures are so well known in the art that the description thereof is believed unnecessary for purposes of describing the present method.

In a formation 10 which has generally uniform characteristics, each water to be injected (i.e., the first injected flood water, the thickened water, and the last injected flood water used to displace the thickened water) can be employed in an amount equal to about 30 percent of the hydrocarbon pore volume of the formation 10 traversed by these injected waters in displacing oil towards the peripheral wells. However, for practical purposes, the amounts of each of the injected waters may be in the range between 20 and 40 percent of the hydrocarbon pore volume of the water-traversed formation 10. The exact amount of each water employed relative to the hydrocarbon pore volume within these ranges is not critical. Satisfactory results may be obtained by employing the injected waters in any amount within the defined ranges of hydrocarbon pore volume that have been herein given.

In many instances, the viscosity of the thickened water containing the water-thickening agent can be made sufficiently high that the water has gel-like characteristics, and a mobility less than 1, within the formation 10. Thus, the thickened water of this gel-like nature permits crossflooding operations to be carried out in the areas 32 at relatively high rates and pressures without any danger of water bypassing into the priorly swept areas 31. This type of thickened water is of especial advantage where the formation 10 is a highly porous and permeable sandstone containing large amounts of oil in place. It will be apparent that in a formation of this character, unless the steps of the present method are employed to prevent it, crossflooding of the areas 32 can cause large amounts of water to be bypassed into the priorly flooded areas 31.

From the foregoing, it will be apparent that there has been described a method which employs waterflooding operations to displace oil from a first swept area of a formation, and then from a second swept area by crossflooding, without suffering significant undesired effects of water bypassing into the priorly water-swept areas. It is intended that the foregoing description is illustrative, and not limitative, of the present method. Further, it will be apparent to one skilled in the art that various changes may be made in the disclosed method without departing from the spirit of the present invention. It is intended that such changes be encompassed within the scope of this invention which is defined by the appended claims.

What is claimed is:

1. A method for recovering oil from a subterranean formation penetrated by a central well surrounded by a plurality of peripheral wells arranged in a geometric pattern with said central well at the midpoint of said geometric pattern, each of said peripheral wells being equidistantly spaced from each of the adjoining peripheral wells, comprising the steps of:

(a) via said central well, injecting flood water into said formation to displace the oil therein towards said peripheral wells, said flood water being injected in an amount sufficient that said flood water arrives at each of said peripheral wells;

(b) via said peripheral wells, recovering said oil displaced by said flood water from said formation;

(c) via said central well, injecting thickened water containing a water-thickening agent to increase the viscosity of said water in an amount such that the mobility of said water is no greater than the mobility of the oil in unflooded regions of the formation, said thickened water displacing the oil and priorly injected water towards said peripheral wells, and said thickened water being injected in an amount sufficient that said thickened water arrives at each of said peripheral wells;

(d) recovering oil from said peripheral wells, said oil being displaced by said thickened water containing a water-thickening agent towards said peripheral wells;

(e) closing in said central well;

(f) via alternate wells of said peripheral wells, injecting flood water into said formation in an amount sufficient to displace oil towards the remaining peripheral wells; and (g) recovering oil from said remaining wells of said peripheral wells not used for injecting flood water into said formation.

2. The method of claim 1 wherein said thickened water containing a water-thickening agent injected in step (c) is displaced through said formation by:

(a) injecting additional flood water into said formation via said central well with oil being recovered from said peripheral wells until unacceptable amounts of said injected waters are produced with the oil.

3. The method of claim 2 wherein each of said waters injected in steps (a) and (c) of claim 1, and in step (a) of claim 2, is employed in an amount equal to about 30 percent of the hydrocarbon pore volume of the portion of said formation traversed by these injected waters in displacing oil towards said peripheral wells.

4. The method of claim 1 wherein the thickened water of step (c) contains a sulfonated poly-(2,6-dialkyl phenol) as a water-thickening agent.

5. The method of claim 1 wherein said thickened water of step (c) contains a water-thickening agent that increases its viscosity in an amount sufficient to provide said water with gel-like characteristics and a mobility less than 1.

6. The method of claim 1 wherein a 5-spot regular geometric well pattern is employed.

References Cited

UNITED STATES PATENTS

| 3,199,587 | 8/1965 | Santourian | 166—9 |
| 2,885,002 | 5/1959 | Jenks | 166—9 |
| 3,113,617 | 12/1963 | Oakes | 166—9 |
| 3,143,169 | 8/1964 | Foulks | 166—9 |
| 3,199,587 | 8/1965 | Santourian | 166—9 |
| 3,208,518 | 9/1965 | Patton | 166—9 |
| 3,308,883 | 3/1967 | Foster | 166—9 |
| 3,380,524 | 4/1968 | Altamira et al. | 166—9 |
| 3,380,525 | 4/1968 | Altamira et al. | 166—9 |

STEPHEN J. NOVOSAD, *Primary Examiner.*

U.S. Cl. X.R.

166—9

UNITED STATES PATENT OFFICE
CERTIFICATE OF CORRECTION

Patent No. 3,429,372 February 25, 1969

Carl Connally, Jr.

It is certified that error appears in the above identified patent and that said Letters Patent are hereby corrected as shown below:

Column 1, line 31, "Food" should read -- Flood --. Column 7, line 20, cancel "3,199,587", "8/1965" and "Santourian ------- 166-9" and insert -- 2,827,964 --, -- 3/1958 --, and -- Sandiford ------- 166-9 --.

Signed and sealed this 24th day of March 1970.

(SEAL)
Attest:

Edward M. Fletcher, Jr.   WILLIAM E. SCHUYLER, JR.
Attesting Officer   Commissioner of Patents